United States Patent Office 2,767,955
Patented Oct. 23, 1956

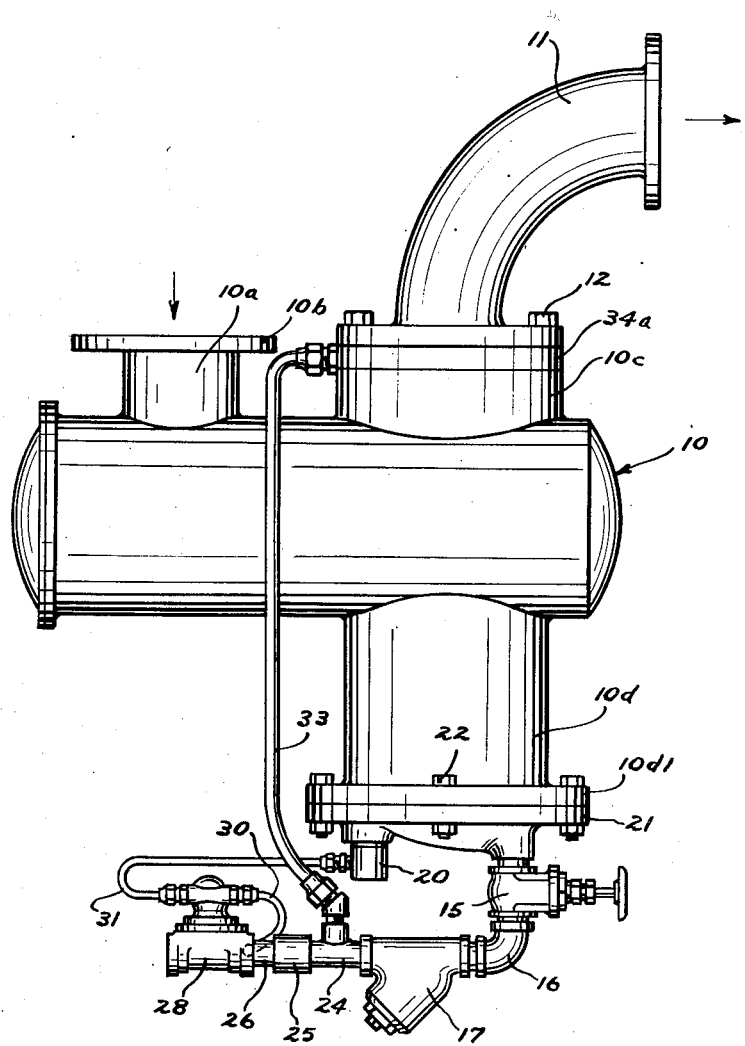

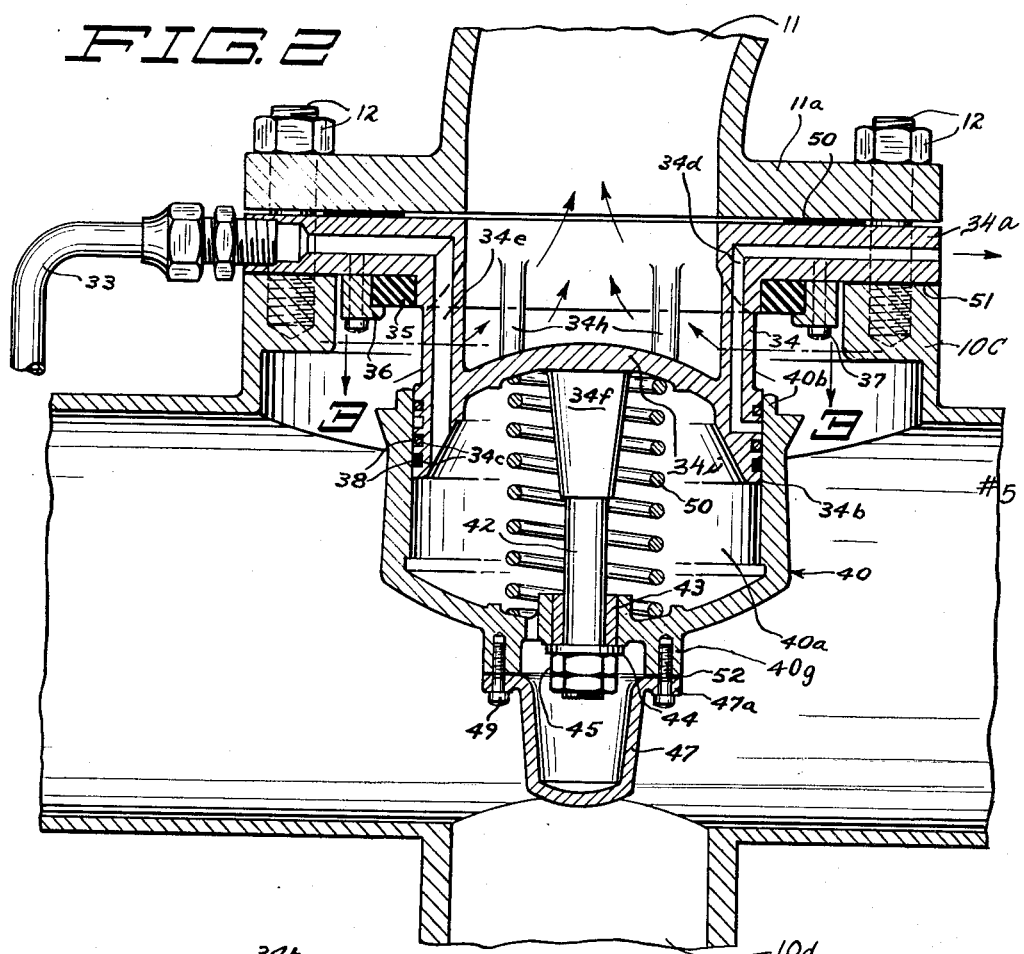
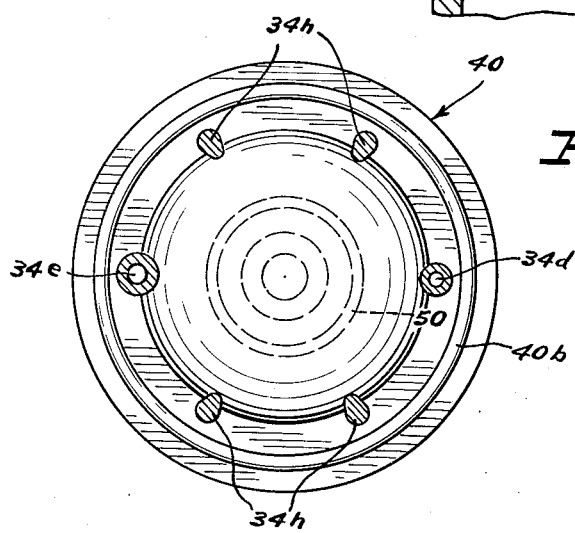

2,767,955

DISCHARGE VALVE FOR SEPARATOR

Robert W. Kenney, South Pasadena, Calif., assignor to Stanley G. Harwood, South Pasadena, Calif.

Application October 27, 1952, Serial No. 317,054

1 Claim. (Cl. 251—29)

This invention relates to a valve for controlling liquids. While said valve may have many applications, it has been particularly designed for use as a discharge valve for a separator, such as a separator for separating water from a hydrocarbon, such as gasoline.

It is an object of this invention to provide a simple structure of valve which can be arranged for automatic operation and which can be made quite light in structure so as to be suitable for use in a device carried on an airplane.

It is a further object of the invention to provide a valve of simple and efficient construction which can be operated by liquid pressure.

It is another object of the invention to provide a valve for use in a separator arranged to control a discharge conduit, the same comprising a casing forming one element of said valve and movable toward and from a valve seat, said casing being movable along a stationary member which with said casing encloses a chamber, together with means for varying the pressure in said chamber so that said casing will be moved by external pressure to close said valve.

These and other objects and advantages of the invention will be fully set forth in the following description made in connection with the accompanying drawings in which like reference characters refer to similar parts throughout the several views and in which:

Fig. 1 is a view in side elevation of a separator;

Fig. 2 is a central vertical section through a portion of the device shown in Fig. 1 taken in a plane parallel to the plane of the drawing; and Fig. 3 is a horizontal section taken substantially on line 3—3 of Fig. 2, as indicated by the arrows.

Referring to the drawings, a separator structure is shown comprising a tank 10 having an inlet conduit 10a, said conduit being provided with a flange 10b to which another conduit may be connected. Tank 10 also comprises an outlet conduit 10c to which a discharge conduit 11 in the shape of an elbow is connected by the headed bolts 12. Tank 10 has a lower portion 10d to which is connected a shut off valve 15 in turn connected by an elbow 16 to a member 17 forming a straining member having a cleanout plug therein. A member 20 is secured to a hub depending from a flanged member 21 which is bolted to the flange 10d1 of portion 10d by the headed and nutted bolts 22. Said member 20 forms a valve actuated by a float (not herein described) in tank 10, and said member has a discharge outlet therein. Said member controls the discharge of liquid flowing thereinto from a tube 31. Member 15 is also connected to a T member 24 which in turn is connected by a coupling 25 and nipple 26 to a pressure controlled valve member 28. Said valve member 28 comprises a discharge outlet, a pressure actuated means for controlling the discharge of liquid through said outlet and an ejector for controlling said means. Valve member 28 has a tube 30 connecting said ejector with said discharge outlet. Said tube 31 connects said ejector with said member 20. The T member 24 has connected thereto by suitable couplings, a tube 33 which is connected to the flanged portion 34a of a member 34 secured to the top of portion 10c. Portion 34a is in turn secured to flange 11a of elbow 11. As shown in Fig. 2, said parts are connected by said headed bolts 12. The parts 15 to 33 are the same as the corresponding parts shown in the application of Robert W. Kenney, filed May 31, 1952, S. N. 290,899 on "Control for Separator." These parts specifically form no part of the present invention and further description thereof is believed to be unnecessary.

In accordance with the present invention, the member 34 is provided which has secured to the bottom of portion 34a a valve seat 35. Seat 35 will be made of some yielding material, as rubber or a rubber composition. Seat 35 is held in place by a ring 36 having a portion extending under the seat 35, the latter being held against the lower side of portion 34a. Ring 36 is secured to portion 34a by the circumferentially spaced screws 37. Member 34 has a depending tubular or cylindrical portion with an imperforate curved top 34i and having an exterior cylindrical surface 34b. Surface 34b is provided with a plurality of grooves 34c shown as rectangular in cross section. Certain of the grooves 34c are filled with packing material 38. One of the grooves 34c communicates with a passage 34d which extends through member 34 and portion 34a to the atmosphere. A passage 34e extends from the bottom of member 34, through portion 34a and communicates with conduit 33.

A casing 40 is provided having a cylindrical bore therein which fits over and is movable on the lower portion of member 34. Member 40 fits tightly against the packing members 38. Casing 40 together with member 34 enclose a chamber 40a. A lug 34f extends downwardly from member 34 centrally of casing 40 and has secured therein a cylindrical rod 42 which extends through a bushing 43 secured in a central hub at the bottom of casing 40. Rod 42 is threaded at its lower end and provided with a washer 44 which engages said hub and with a pair of nuts 45, the upper one of which engages washer 44. Rod 42 is slidable in bushing 43. A member 47 of cup-like form has a flange 47a engaging the bottom of an annular flange 40g on casing 40 and said flanges are secured together by circumferentially spaced headed screws 49. Suitable gaskets 51 and 52 are disposed between the connected flanges above described. Member 34 is stationary and its portion 34a is connected to its lower portion and top portion 34i by a plurality of spaced arms or posts 34h, as shown in Fig. 3. Passages 34d and 34e pass through certain of said arms 34h. Casing 40 has at its top an annular flange 40b having a somewhat convex upper surface adapted to engage seat 35. A compression coiled spring 50 engages the bottom portion of casing 40 at its lower end and the bottom portion of member 34 at its upper end. Spring 50 thus normally urges the casing 40 downwardly, as shown in Fig. 2, to the position shown.

Applicant's device is intended to be used with two liquids of different specific gravities, such as water and gasoline, for the separation of the same, such as water from the gasoline and the discharge of said water at desired intervals. Applicant's device herein described is adapted to control the discharge of said water. The tank 10 will contain liquid under pressure. Said liquid in the operation here described will be a hydrocarbon, such as gasoline, from which water is separated. Said liquid will be supplied to said tank under pressure through the inlet conduit 10a and said gasoline will pass through said tank and through the discharge member 11 when the valve formed by members 40 and 34 is open. Said valve is normally held in open position. This liquid will pass through the spaces between the arms 34h as indicated by the arrows in Fig. 2. The following operation will describe the discharge of water and the term "liquid" as hereinafter used will have reference to water. As set forth in said previously filed application, said liquid under pressure will pass in either direction through passage 34e, conduit 33 and to or from valve 28. Hence the pressure in chamber 40a will be increased or decreased. As liquid passes through passage 34e and into conduit 33, the pressure in chamber 40a will be decreased. When said pressure in chamber 40a is decreased to a point where it is less than the pressure in tank 10, then said pressure in tank 10 will move valve member 40 upwardly to a closed position until said valve engages valve seat 35. Liquid from said tank 10 will pass through valve 15, when it is in open position, and through members 16, 17, 24, 25 and 26, and into member 28. A float in portion 10d of said tank 10 will rise when liquid accumulates and rises in said tank. When in raised position said float will actuate member 20 and place it in open position. Liquid moving through conduit 33 and into valve 28 and the liquid moving through valve 15 and into valve 28 will pass through conduits 30 and 31 and be discharged to atmosphere through a discharge outlet in member 20 when member 20 is in open position. Liquid passing through conduit 30 will pass through the ejector in member 28 and this action will decrease the pressure in member 28 and cause the discharge outlet of member 28 to become opened. Thus liquid from tank 10 and liquid passing through conduit 33 is readily discharged to the atmosphere through member 20 and also through member 28. As the liquid is lowered in tank 10, the float therein will be lowered until member 20 is placed in closed position and the back pressure then created in conduit 31 will act to close the discharge outlet in member 28. A back pressure of fluid will also be created in conduit 33 to the point where this back pressure plus the pressure of spring 50 will act to move valve 40 into open position. The above described operation is then repeated whereby the accumulation of liquid in said tank, namely water, is thereby controlled and discharged at desired intervals.

It will be seen that I have provided a very simple and efficient valve structure to be used in a separator. The action in the valve is automatic and it will move to open and closed position in accordance with the pressure in chamber 40a and in tank 10. The valve can be constructed so as to be light in weight and it is particularly adapted to air-borne separators. The device has been amply demonstrated in actual practice, found to be very successful and efficient and it is on its way to commercial production.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claim.

What is claimed is:

A fluid control valve having in combination, a casing having a stationary portion comprising an annular flange and a depending cylindrical portion and a curved imperforate portion extending thereacross, a plurality of arms connecting said cylindrical portion and said flange, passages through some of said arms, said cylindrical portion having a groove thereabout, one of said passages leading from said groove to the atmosphere, a valve seat surrounding said portion adjacent the bottom of said flange, an annular valve fitting and slidable on said cylindrical portion and having an end adapted to be seated against said valve seat, a chamber formed by the lower end of said cylindrical portion and the other end of said valve, a spring disposed in said chamber for normally holding said valve in open position, the other end of said passages leading from said chamber to the exterior of said flange for supplying liquid under pressure thereto or draining liquid therefrom, a fluid receiving chamber in said casing having said valve disposed therein whereby said valve is movable to open or closed position as the pressures respectively change in said first and second mentioned chambers.

References Cited in the file of this patent

UNITED STATES PATENTS

| | | |
|---|---|---|
| 1,472,191 | Nichols | Oct. 30, 1923 |
| 1,646,640 | Daniels | Oct. 25, 1927 |
| 1,739,015 | Pascale | Dec. 10, 1929 |
| 2,087,037 | McCarthy | July 13, 1937 |

FOREIGN PATENTS

| | | |
|---|---|---|
| 522,720 | Germany | Apr. 14, 1931 |
| 77,968 | Switzerland | Nov. 1, 1918 |